(No Model.)
C. P. & F. WAHLSTRÖM.
RELEASING DEVICE.
No. 392,704. Patented Nov. 13, 1888.
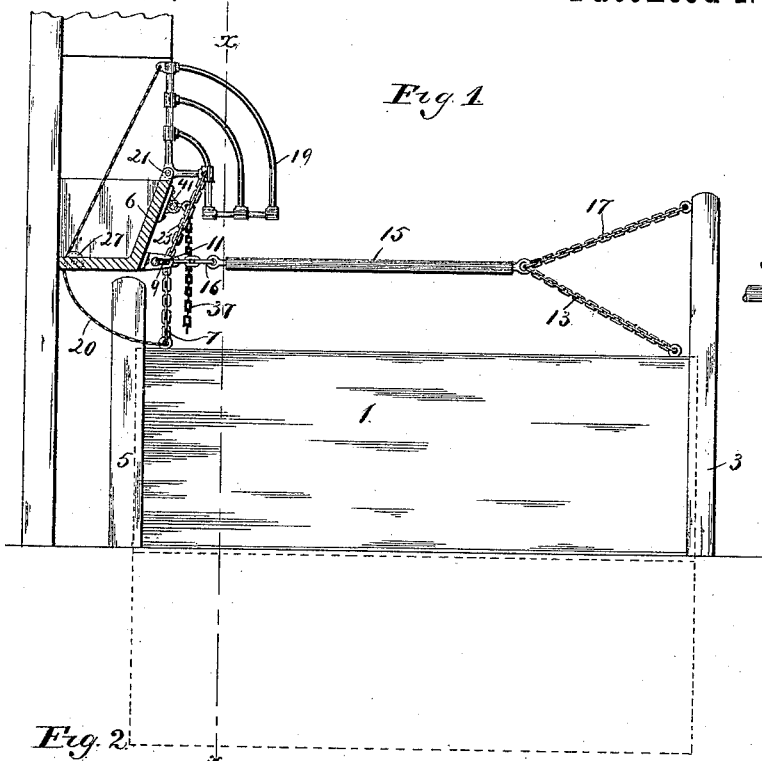
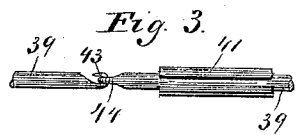
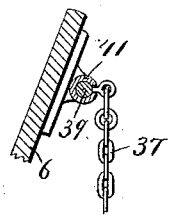
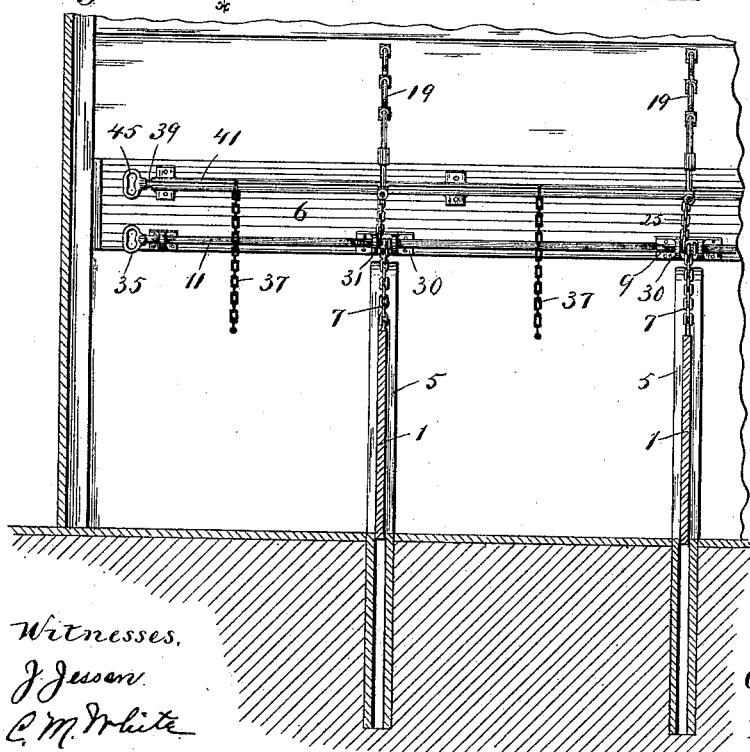
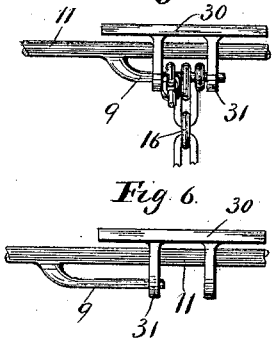
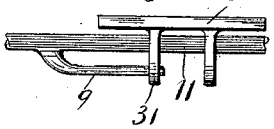
Witnesses.
J. Jessen
C. M. White
Inventors.
Carl P. Wahlstrom
Frank Wahlstrom
By Paul, Sanford & Merwin Att'ys

United States Patent Office.

CARL P. WAHLSTRÖM AND FRANK WAHLSTRÖM, OF ST. PAUL, MINNESOTA.

RELEASING DEVICE.

SPECIFICATION forming part of Letters Patent No. 392,704, dated November 13, 1888.

Application filed June 26, 1888. Serial No. 278,296. (No model.)

*To all whom it may concern:*

Be it known that we, CARL P. WAHLSTRÖM and FRANK WAHLSTRÖM, citizens of Sweden, residing in St. Paul, in the county of Ramsey and State of Minnesota, have invented certain new and useful Improvements in Safety-Stalls, of which the following is a specification.

Our invention relates to stables for horses and cattle; and it consists in appliances attached to the stalls of such a stable by means of which the animals confined therein can be quickly freed and removed therefrom in case of fire or other imminent danger.

In the drawings forming part of the specification, Figure 1 is a side elevation of our movable stall-partition with its attachments in position. Fig. 2 is a cross-section of stalls fitted with our improvements on line $x\ x$ of Fig. 1. Figs. 3, 4, 5, and 6 are details.

In the drawings, 1 is a movable stall-partition adapted to slide vertically through an opening in the floor of the stable and between the posts 3 and 5. It is supported in its raised position, as shown in Fig. 1, at one end by the chain 7, which engages the prong or spur 9 of the sliding bar 11 between the ears 31 of the clip 30. The other end is supported by the chain 13, connected to the bar 15, which bar is also supported by the chain 16, attached to said prong 9 at its forward end and at the other end by the chain 17, fastened to the post 3.

The bar 15 is preferably made of metal pipe with a core of wood to give it sufficient rigidity, and to which the chains can be readily connected at either end.

19 is a guard, made, preferably, of metal pipe and adapted to be interposed between the heads of the animals confined in adjoining stalls. It is pivoted to the stable-manger at 21, and is held turned forward in the position shown in Fig. 1 by the chain 25, engaging the prong 9 in the same manner as the chains 7 and 16. When by the sliding of the rod 11 the prong 9 releases the chains, a chain or wire, 20, fastened to the partition 1 and guard 19 and running over a sheave, 27, pulls the guard back out of the way by means of the weight of the partition as it falls.

11 is a rod properly supported and adapted to slide along the front side of the manger 6 through the clips 30, fastened to the manger directly over each stall-partition. This rod is provided with the prongs or spurs 9, adapted to slide into and through the holes in the clips 30 and engage the chain-connections, heretofore described, of the partition, the bar 15 and guard 19, and to simultaneously release all of these connections when the rod is moved sufficiently to withdraw the prongs from the clips. These prongs may be rigidly fixed to the rod 11, as shown, or adapted to slide upon it and to be held in proper position by springs.

The rod 11 is fitted with a suitable handle, 35, at one end, by means of which it can be operated and cause its prongs 9 to engage or release the link-connections for all of the stall-partitions in the stable, a head or stop at its other end preventing its being entirely withdrawn.

37 is a hitching chain or strap in each stall for fastening the animal confined therein, attached to the rod 39, which is adapted to slide in proper supports along the front of the manger. We prefer to use for this support a sleeve consisting of a slotted metal pipe, 41, rigidly fastened to the manger, and into which the rod 39 can be readily inserted and withdrawn, the slot allowing the fastening of the chain 37 to slide freely in it. This rod 39 has a handle, 45, for operating it, and is preferably made in sections, one for each stall of the stable, each provided at one end with the hook 43 and at the other with the eye 44, by means of which they can be readily connected or disconnected when removed from the pipe 41.

The partition 1, guards 19, and bars 15 are necessary only when horses are confined in the stalls and are not intended to be used when the stalls are occupied by cattle, as these appliances are intended to protect the horses from being kicked or bitten by those next them.

A side door in the stable near the handles 35 and 45 is provided, to permit one readily to reach the handles 35 and 45 in case of fire or other sudden danger, and through which the animals confined in the stable can be removed.

The mode of operation is as follows: When the stalls are to be occupied by horses, the partitions 1 are raised, and, together with the bars 15 and the guards 19, are connected by their respective chains to the prongs 9, which are pushed sufficiently into the clips 30 to allow the links of the chains to be slipped on the prongs, and all the partitions being in place, the rod 11 is pushed in position so as to force the prongs through both ears of the clips and thus hold the links from slipping off. If the prongs 9 are adapted to slide on the rod and be held forward by springs, the rod may be pushed in and properly fastened in place and each link-connection be made separately by springing back the prong in each case and slipping on the links. The horses can then be placed in the stalls and fastened by the hitching devices. If the stable is occupied by cattle, they are simply hitched therein without having the stall-partitions raised, or as many partitions may be placed in position as desired and the others left down. In case of fire or other sudden danger necessitating the prompt removal of the animals confined in the stables they are freed by throwing open the side door of the stable, pulling back the rod 11, so as to drop all the partitions, and then withdrawing the rod 39 from its support, and by means of it leading the animals out of the door. The sections of the rod 39 can then be unhooked from each other and each animal controlled and handled independently.

We claim as our invention—

1. In a stable, the combination, with the posts 3 and 5, of the partition 1, adapted to slide vertically in or on said posts, the bar 15, the guard 19, the rod 11, provided with the prongs 9, adapted to slide in the clips 30 and by engaging their respective chain-connections to support the said partition 1, the bar 15, and the guard 19, substantially as described.

2. In a stable, the combination, with a rod, 39, having hitching devices attached thereto, of the clips 30, the rod 11, provided with the prongs 9, the guard 19, the partition 1, and the bar 15, said guard, partition, and bar being provided with suitable chains or links adapted to be engaged by the prongs 9, substantially as described.

3. In a stable having a suitable manger, 6, and posts 3 and 5, the combination, with the pronged rod 11, of the partition 1 and the bar 15, flexibly connected to the post 3, said bar and partition having suitable link or other connections by means of which they can be supported by the prongs of the rod 11 when thrust through the clips 30, substantially as described.

4. In a stable, means for hitching and removing animals confined therein, consisting of a slotted tube or sleeve, 41, supported in front of the stalls, the rod 39, adapted to slide freely in said sleeve and to be entirely withdrawn from it, and the hitching devices 37, attached to and moving with said rod, substantially as described.

5. Means for securing animals in a stable and for removing them therefrom, comprising, in combination, a series of movable stall-partitions, a rod mounted in suitable bearings and arranged to be drawn longitudinally through its bearings and to be wholly withdrawn from them, and a series of hitching devices secured to said rod and movable with it, whereby the animals attached thereto may be led from the stable by withdrawing said rod from its bearings, substantially as described.

CARL P. WAHLSTRÖM.
FRANK WAHLSTRÖM.

Witnesses:
E. STREICHENBERG, Jr.,
C. M. WHITE.